United States Patent [19]

Goldstone

[11] Patent Number: 4,807,240
[45] Date of Patent: Feb. 21, 1989

[54] FREQUENCY ADDING LASERS AND OPTICAL AMPLIFIERS

[75] Inventor: Jeffrey A. Goldstone, Los Angeles, Calif.

[73] Assignee: Rockwell International Corporation, El Segundo, Calif.

[21] Appl. No.: 142,100

[22] Filed: Jan. 11, 1988

[51] Int. Cl.$^4$ .............................................. H01S 3/09
[52] U.S. Cl. ........................................ 372/69; 372/70; 372/91
[58] Field of Search .................... 372/69, 70, 91, 55; 307/424, 425

[56] References Cited

U.S. PATENT DOCUMENTS 3,914,618 10/1975 Harris .................................. 307/425

OTHER PUBLICATIONS

J. P. Gordon et al., "The Maser–A Type of Microwave Amplifier, Frequency Standard, and Spectrometer," Physical Review 99, Aug. 1955, pp. 1264–1274.
A. L. Schawlow et al., "Infrared and Optical Masers," Physical Review 112, Dec. 1958, pp. 1940–1949.
T. H. Maiman, "Stimulated Optical Radiation in Ruby Masers," Nature, 187, Aug. 1960, pp. 493–494.
R. H. Pantell et al., Fundamentals of Quantum Electronics, John Wiley and Sons Inc., New York, 1969, pp. 101–103.
R. A. Fisher (Ed.), Optical Phase Conjugation, Academic Press, New York, 1983, pp. 1–22.
A. Penzkofer et al., "High Intensity Raman Interactions," Prog. Quant. Electr. 6, 55–140, 1980, pp. 56–57.
J. F. Reintjes, Nonlinear Optical Parametric Processes in Liquids and Gases, Academic Press, Inc., New York, 1984, pp. 1–30.
Y. R. Shen, Principles of Nonlinear Optics, Academic Press, New York, 1984, pp. 86–107 and pp. 187–192.
M. Sargent III, et al., Laser Physics, Addison-Wesley, Reading, Mass., 1974, pp. 45–54.
M. B. Spencer et al., Laser With A Transmitting Window, Physical Review A, vol. 5, No. 2, Feb. 1972, pp. 884–892.

Primary Examiner—William L. Sikes
Assistant Examiner—B. Randolph
Attorney, Agent, or Firm—H. Fredrick Hamann; Harry B. Field; Lawrence N. Ginsberg

[57] ABSTRACT

A method for creating population inversions for use in stimulated emission devices which beam combine, beam clean-up, or frequency up-convert electromagnetic radiation. The invention comprises near resonantly enhanced multiphoton pumping of a multilevel quantum medium with pump beams of appropriate intensities and frequencies detuned from the transition frequencies of the medium. The intensities are orders of magnitude lower than those required for non-resonantly enhanced multiphoton pumping. The detuning is smaller for the maximum multiphoton resonance than for the single photon resonances. Appropriate medium decay constants are required for creating a population inversion between energy levels of the quantum medium. The population inversion exists between energy levels of the medium whose energy difference may exceed the energy of any single pump photon energy. The appropriate energies, detunings, intensities, and decay constants are determined by analysis of the semiclassical Densities Matrix equations for the multilevel quantum medium. The energy extracted from the population inversion may be at a frequency nearly equal to or greater than the pump frequencies.

7 Claims, 9 Drawing Sheets

FREQUENCY ADDING LASERS AND OPTICAL AMPLIFIERS

BACKGROUND OF THE INVENTION

1. Field of the Invention

This invention relates to coherent radiation devices and more particularly to optically pumped lasers, optical amplifiers, optical beam cleanup devices, optical beam combiners, and frequency up-conversion devices having input and output beams ranging in wavelengths from centimeters to nanometers.

2. Description of the Prior Art

MASERS, LASERS, AND OPTICAL AMPLIFIERS

The principal requirement for producing a laser or optical amplifier is that the laser or amplifier medium be inverted. This means that in the transition of interest there is a greater population of atoms or molecules in the upper quantum state than in the lower quantum state. Such media display "negative" absorption or gain. A variety of methods are used to provide population inversions. In 1954 the first microwave laser (maser) was developed (J. P. Gordon, H. J. Zeiger, and C. H. Townes, "The Maser-A Type of Microwave Amplifier, Frequency Standard, and Spectrometer," Phys. Rev. 99, 1264-1274, August, 1955) in which an inverted population was achieved in ammonia gas by a spatial separation of energy states. In 1958 the optical maser, or laser, was proposed (A. L. Schawlow and C. H. Townes, "Infrared and Optical Masers," Phys. Rev., 112, 1940-1949, December, 1958), and in 1960 the first laser was in operation (T. H. Maiman, "Stimulated Optical Radiation in Ruby Masers," Nature, 187, 493-494, August, 1960).

Three features are common to all lasers and maser (R. H. Pantell and H. E. Puthoff, Fundamentals of Quantum Electronics, John Wiley and Sons, Inc., New York (1969) pp. 101-103):

1. An excitation mechanism. This mechanism may be electromagnetic radiation, charged particle beams or currents, chemical reactions, etc. The purpose of the mechanism is to invert the gain medium so that the inversion energy may be extracted by a coherent electromagnetic beam.

2. An active medium. This medium may be a gas, liquid, solid, or plasma that sustains the inverted population.

3. A circuit. Electromagnetic radiation from the active medium is coupled to the external environment by means of a circuit. At infrared or optical frequencies the circuit is usually an interferometer resonator, and for masers a cavity resonator is used.

Optical amplifiers require features (1) and (2), but not feature (3). In place of the circuit, a small input beam is used which is amplified by its passage through the inverted medium thus extracting the stored energy from the medium.

FIG. 1 displays a typical population inversion scheme. The pump quantum drives the system from level 1 to level 4. The system (atom molecule, etc.) then decays due to any number of mechanisms (spontaneous emission, collisional decay, etc.) from level 4 to level 3. The decay rate into level 3 (the upper level of the inverted level pair) is greater than the decay rate out of that level. This leads to a population buildup in level 3 which, when it exceeds the population in level 2 (the lower level of the inverted level pair), allows for optical gain through stimulated emission. A number of other pumping schemes have been proposed and demonstrated. All have one essential feature in common. In current laser, maser, and optical amplifier pumping techniques the pump quantum (optical, chemical, mechanical, etc.) which is used to excite the gain medium contains more energy than the lasing or amplified quantum. This, in effect, makes optically pumped lasers, masers, and optical amplifiers frequency down-conversion devices.

OPTICAL BEAM CLEANUP DEVICES

In order to accurately and efficiently transfer coherent electromagnetic energy from its generating source to a desired location it is necessary to have a well defined (usually flat) phase across the beam. Optical beams whose phase fronts are flat are said to have good beam quality. There are many processes in laser, maser, and optical amplifier devices which tend to distort this phase and thus degrade the beam quality of these devices. A number of mechanical and nonlinear optical techniques have been proposed and demonstrated which provide some measure of correction. Two basic procedures are currently used:

1. Phase front cleanup via mechanical devices such as deformable mirrors and nonlinear optical techniques such as optical phase conjugation (see e.g. R. A. Fisher (Ed.), Optical Phase Conjugation, Academic Press, New York (1983) pp. 1-22). These devices may be part of or external to the beam generation device. Deformable mirrors are limited to correction of phase imperfections whose scale size is no smaller than the spacing between mirror actuators. Nonlinear optical phase conjugation requires high intensities (usually $MW/cm^2$ or higher).

2. Energy transfer from a beam with poor beam quality to another beam which maintains good beam quality. Typically a nonlinear optical process is used which requires high intensities (often $MW/cm^2$ or higher). At such intensities other parasitic nonlinear optical processes often occur. Stimulated Raman scattering has been studied extensively for this purpose, (see e.g. A. Penzkofer, A. Laubereau, and W. Kaiser, "High Intensity Raman Interactions," Prog. Quant. Electr., 6, 55-140, 1980 pp. 56-57) as have other parametric wave mixing processes (see e.g. J. F. Reintjes, Nonlinear Optical Parametric Processes in Liquids and Gases, Academic Press, Inc. New York, 1984 ppg. 1-30) such as multiwave mixing and optical parametric amplification. These processes, in general, require accurate phase matching of input beams which in turn limits the applicability of these processes for many applications.

FREQUENCY UP-CONVERSION DEVICES

A number of nonlinear optical techniques have been exploited to up-convert coherent electromagnetic beams. Typcially this involves phase matched, high intensity ($MW/cm^2$) parametric wave mixing such as harmonic generation (see e.g. Y. R. Shen, Principles of Nonlinear Optics, Academic Press, New York, 1984 pp. 86-107) or anti-Stokes Raman generation (see e.g. A. Penzkofer, A. Laubereau, and W. Kaiser, "High Intensity Raman Interactions," Prog. Quant. Electr., 6, 55-140, 1980 pp. 56-57).

OPTICAL BEAM COMBINERS

It is not possible to scale lasers to arbitrary size and power. As such, a number of devices have been proposed and/or demonstrated which would allow a number of laser beams to be combined into one more powerful beam. The essential requirement is that the individual laser beams be combined coherently, i.e., that the N beams are combined in such a fashion that each is in phase with all N−1 other beams. In this case the intensity of a combination of N beams is $N^2$ times the intensity of each combined beam individually. A number of methods have been proposed and/or demonstrated which provide beam combination under certain conditions:

1. Phased arrays. These devices generally adjust the optical path length that beams from different lasers must travel so that the wave fronts of the beams from each laser matches those of the other lasers. This requires path control of much better than a wavelength (typcially 300 nanometers to tens of microns), and usualy on the order of one tenth to one fiftieth of a wavelength. Difficulties arise in large laser systems where there are typically significant mechanical vibrations and often multiaxial mode outputs which prevent path matching of all axial modes from the combined lasers.

2. Coupled resonators, injection locked resonators, master-oscillator-power-amplifiers (MOPA) configurations. By feeding power from one laser to one or more other lasers it is possible under certain conditions to lock the phases of a number of lasers together (M. Sargent III, M. O. Scully, W. E. Lamb Jr., Laser Physics, Addision-Wesley Reading, Mass., 1974, pp. 45-54, M. B. Spencer and W. E. Lamb, Jr., Phys. Rev. A 5, 884-892, (1972). In general the difficulties encountered in (1), directly above, apply here also.

3. Nonlinear Optical beam combining. These techniques include stimulated Brilliouin scattering (see e.g. Y. R. Shen, Principles of Nonlinear Optics, John Wiley, New York, 1984, pp. 187-192), simulated Raman scattering, optical phase conjugation, and other parametric wave mixing techniques. As above, high intensity beams and phase matching conditions are required.

OBJECTS OF THE INVENTION

The principal object of the present invention, therefore, is to create population inversions for use in stimulated emission devices in such a manner as to allow the output beam of these devices to be near the frequency or at a greater frequency than the frequency of the input beams.

Another object is to provide a means for optically pumped lasers, masers, and optical amplifiers to produce coherent radiation at wavelengths shorter than the pump wavelengths.

Another object is to provide a means for improving the beam quality of laser devices which does not require high intensities or mechanical devices such as deformable mirrors.

Yet another object is to provide a means for frequency up-converting coherent electromagnetic radiation without the high intensities and phase matching requirements of traditional nonlinear optical processes.

Still another object is to provide a means for beam combining multiple coherent radiation sources and to provide an output beam near the same frequency as the pump fields or at a frequency greater than that of the pump fields without the high intensities required of nonlinear optical techniques or the pathlength control required of mechanical techniques.

Other objects, advantages and novel features of the present invention will become apparent from the following detailed description of the invention when considered in conjunction with the accompanying figures.

SUMMARY OF THE INVENTION

The present invention provides a method for creating population inversions for use in stimulated emission devices which beam combine, beam cleanup, and/or frequency up-convert electromagnetic radiation. In its broadest aspects, the invention comprises the near resonantly enhanced multiphoton pumping of a multilevel quantum medium with pump beams of appropriate intensities and frequencies detuned from the transition frequencies of the medium. The intensities are orders of magnitude lower than those required for nonresonantly enhanced multipohton pumping. The detuning is smaller for the maximum multiphoton resonance than for each single photon resonance. Appropriate medium decay constants are required for creating a population inversion between energy levels of the quantum medium. The population inversion exists between energy levels of the medium whose energy difference may exceed the energy of any single pump photon energy. The appropriate energies, detunings, intensities, and decay constants are determined by analysis of the semiclassical density matrix equations for the multilevel quantum medium. The energy extracted from the population inversion may be at a frequency nearly equal to or greater than the pump frequencies.

BRIEF DESCRIPTION OF THE DRAWINGS

FIG. 3 displays zero damping limit Rabi cycling of a three level system when the maximum level 1 to level 3 level transfer condition is chosen. The level population probabilities n1, n2, and n3 vary with time under influence of the two pump fields.

FIGS. 5b-5f illustrate the steady state populations, N1-N5, respectively, under the conditions described for FIG. 5a.

The same elements or parts throughout the figures of the drawings are designated by the same reference characters, while equivalent elements bear a prime designation.

DETAILED DESCRIPTION OF THE INVENTION

The present device may be operated in four distinct but related modes. In a first mode the device functions as an optically pumped laser, maser, or optical amplifier. In a second mode the device functions as an optical beam cleanup device. In a third mode the device functions as a frequency up-conversion device. In a fourth mode the device functions as an optical beam combiner. Each mode is dependent on the inversion mechanism which is described in detail in the following subsection regarding theoretical considerations. Following that subsection each mode of operation is then described.

THEORETICAL CONSIDERATIONS

Figure 1:
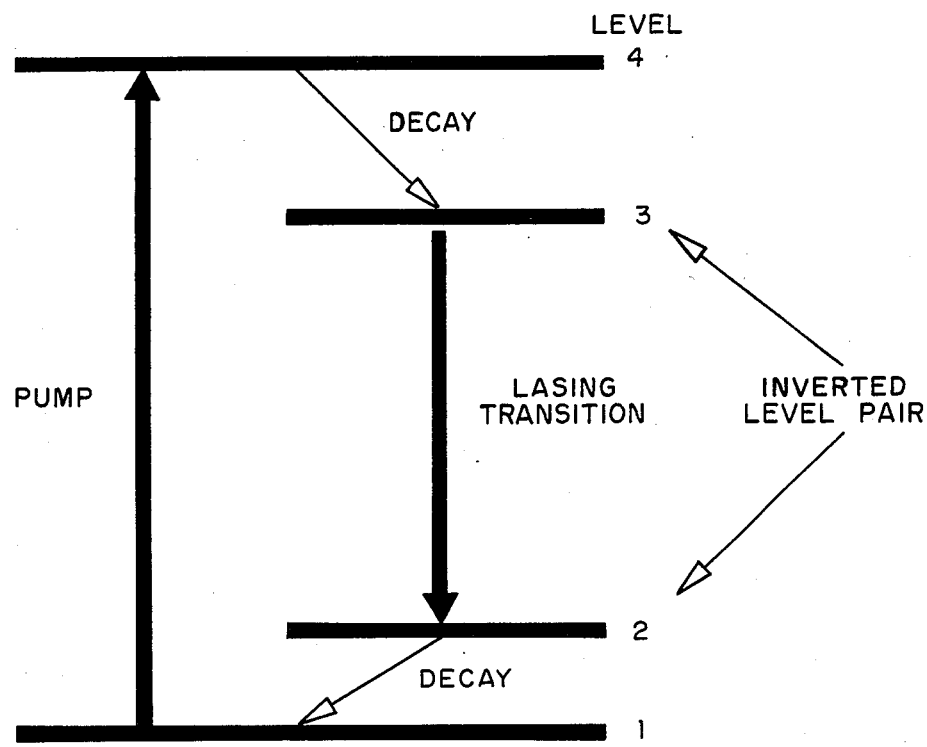
FIG. 1 contains an energy level diagram of a typical prior art, four level quantum system wherein pumping occurs between level 1 and level 4, and lasing occurs between level 3 and level 2.

As noted above, current laser, maser, and optical amplifier pumping techniques require that the input quanta (photons for optical pumping) contain more energy per quantum than the output quanta. This follows from the unavoidable losses (to spontaneous emission, waste heat, etc.) in the transitions between levels 4 to 3 and levels 2 to 1 as shown in FIG. 1. Photon energy and frequency are related by $E=hf$, where E is the photon energy, h is Planck's constant, and f is the optical frequency. Furthermore, the photon wavelength and frequency are related by $\lambda=c/(nf)$, where c is the speed of light, n is the refractive index of the medium, and f is the optical frequency. From this it follows that prior art optically pumped lasers, masers, and optical amplifiers are frequency down converters in the sense that the output field has a lower frequency (and longer wavelength) than does the pump field(s). The present invention operates in precisely the reverse direction, i.e. the device output field may have a higher frequency (shorter wavelength) than any or all of the pump fields.

Figure 2:
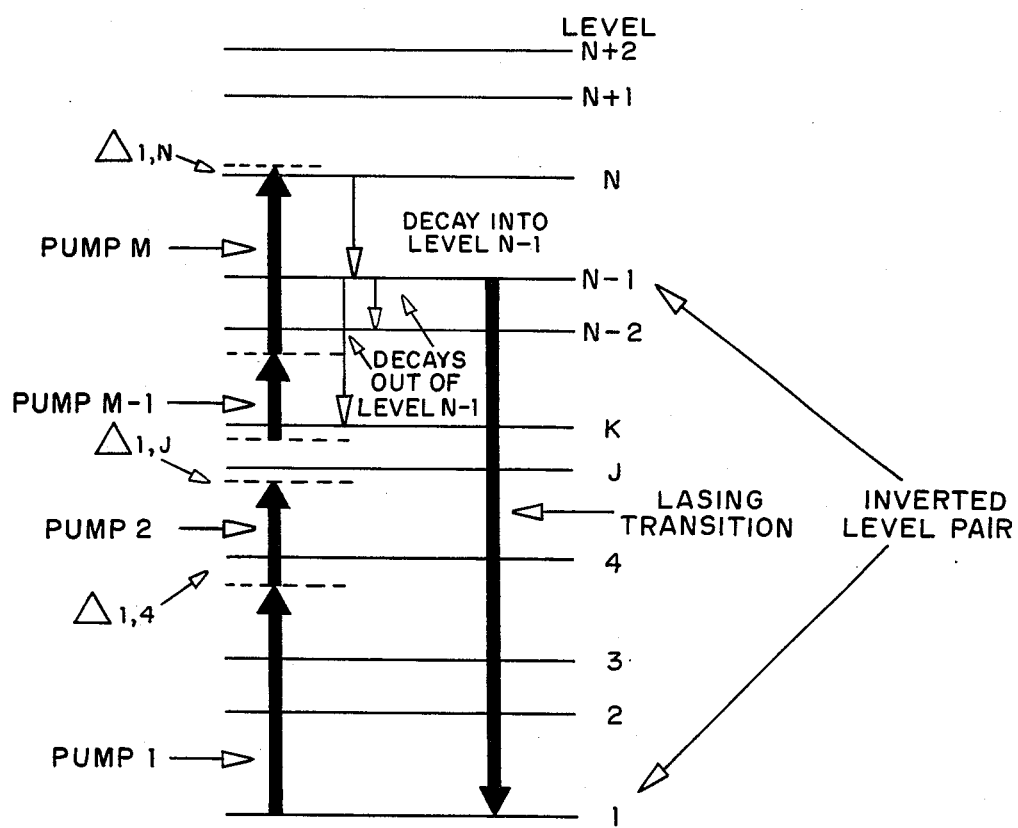
FIG. 2 contains an energy level diagram of a multilevel quantum system of the present invention with N active levels driven by M pump beams.

FIG. 2 displays a representative multilevel quantum system according to the teachings of the present invention to which $N>=3$ levels are being pumped by M coherent electromagnetic sources ($M<=N-1$). The M pumps may connect any set of level pairs for which optical transitions exist. (The energy levels, pump and lasing transitions in FIG. 2 are meant to simply be a representative example.) Each of the M pumps are detuned from their respective transitions by an amount $\Delta_{ij}$ where i is the lower of the two levels and j is the upper of the two levels. The M pumps are detuned by an amount $\Delta_{1N}$ from the M photon resonance between levels 1 and N. One through M−1 photon resonances are defined in an analogous way, as shown in FIG. 2. The N levels are connected by decay constants determined by, e.g., spontaneous emission lifetimes or collisional quenching.

Under appropriate conditions steady-state population inversions may be created. When transitions exist between these inverted levels a feedback mechanism such as a laser or microwave cavity, or an input seed beam (optical amplifier) may be used to extract the energy stored in the inverted medium. When the inversion exists between nonadjacent levels for which an electromagnetic transition exists the extracted energy may be of a higher frequency (shorter wavelength) than one or more of the pump beams. When an inversion exists between adjacent pumped levels, energy may be extracted at (or near) the same frequency as one of the pump beams.

The applicant has developed detailed numerical and analytic models of these processes using the semiclassical Density Matrix formulation of quantum mechanis (see, e.g., M. Sargent III, M. O. Scully, and W. E. Lamb Jr., Laser Physics, Addison-Wesley, Reading, Mass., 1974). Within this formulation the medium is described by quantum mechanics, while the electromagnetic fields are treated classically. This common formulation applies whenever the number of photons (photon occupation number) is large, as is the case here. Results of these models, presented below, indicate that inversions may be created under reasonable conditions. First we begin with an intuitive description of the inversion process.

A Rabi frequency $\Omega$ is defined for each pump, $$\Omega = \mu E/(2\hbar) \tag{1}$$

where $\mu = <i|\mu|j>$ is the dipole matrix element connecting the two levels in question, E is the electric field amplitude of the electromagnetic field, and $\hbar$ is Planck's constant divided by $2\pi$. The Rabi frequency is a measure of the strength of the coupling of the electromagnetic field and the level pair. In a simple two level system it is the frequency of the sinusoidal oscillation of population between the two levels when the photon energy matches the energy gap between the two levels.

If we ignore for the moment the damping mechanisms within the multilevel system, we find that by choosing the detunings of the 1 through M photon energies from the 1 through N levels appropriately it is possible to create an effective total population cycling between levels 1 and N where virtually no population is found in levels 2 through N−1. For simplicity we first consider N=3 and M=2. The maximum transfer condition for this system may be written as (D. M. Larsen and N. Bloembergen, Optics Commun. 17, 254, June, 1976).

$$\Delta_{13} = (\Omega_{12}^2 - \Omega_{23}^2)/\Delta_{23}. \tag{2}$$

Figure 3A:
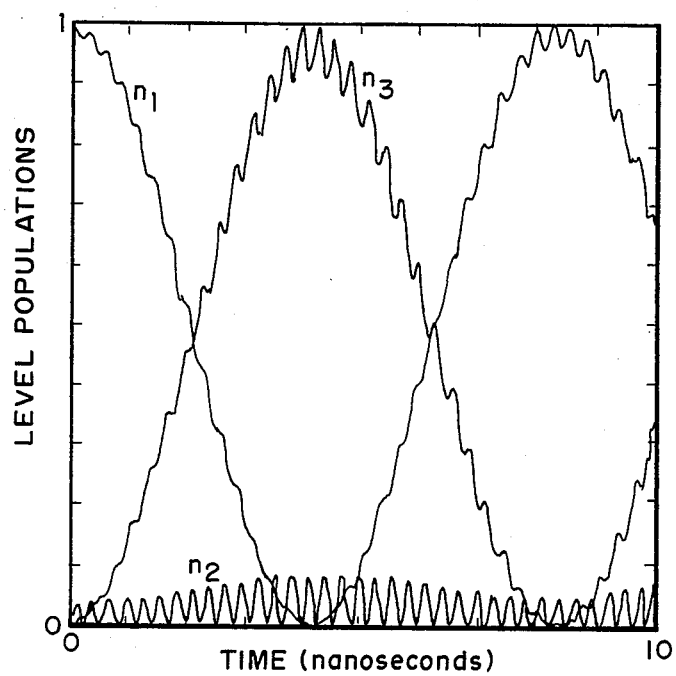
In FIG. 3a the total population is found in level 1 at t=0.
Figure 3B:
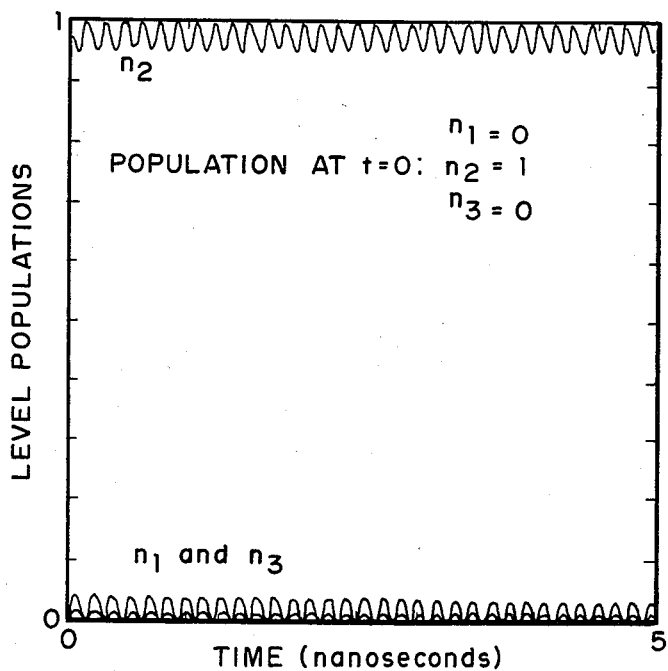
In FIG. 3b the total population is found in level 2 at t=0.

The population transfer process is demonstrated in FIGS. 3a and 3b for N=3 and M=2, where $n_1(t)$, $n_2(t)$, and $n_3(t)$ are the time dependent population probabilities of levels 1, 2, and 3 respectively. In FIG. 3a the total population at t=0 is in level 1. In FIG. 3b the total population at t=0 is in level 2. These figures demonstrate that the pump fields neither take population into nor out of level 2. More generally we have shown that under appropriate conditions in N-level Rabi cycling, as in the 3-level case displayed, the pump fields transfer populations between levels 1 and N, but do not transfer population into or out of the internal levels 2 through N−1 inclusive.

Including the system's damping mechanisms, the applicant has found that if there exists a higher decay rate into an internal level than out of the level (e.g. level N−1 in FIG. 2) a population bottleneck develops. This leads to the inversions between this level and levels lower down the ladder. Furthermore, by increasing the coupling between the upper inversion level and a level above it, the applicant has shown that it is possible to create further population inversion pairs within the level system. In FIG. 2, this would correspond to adding a pump field coupled to the N−1 to N level pair which then pulls population into level N from level N−1.

Figure 4A:
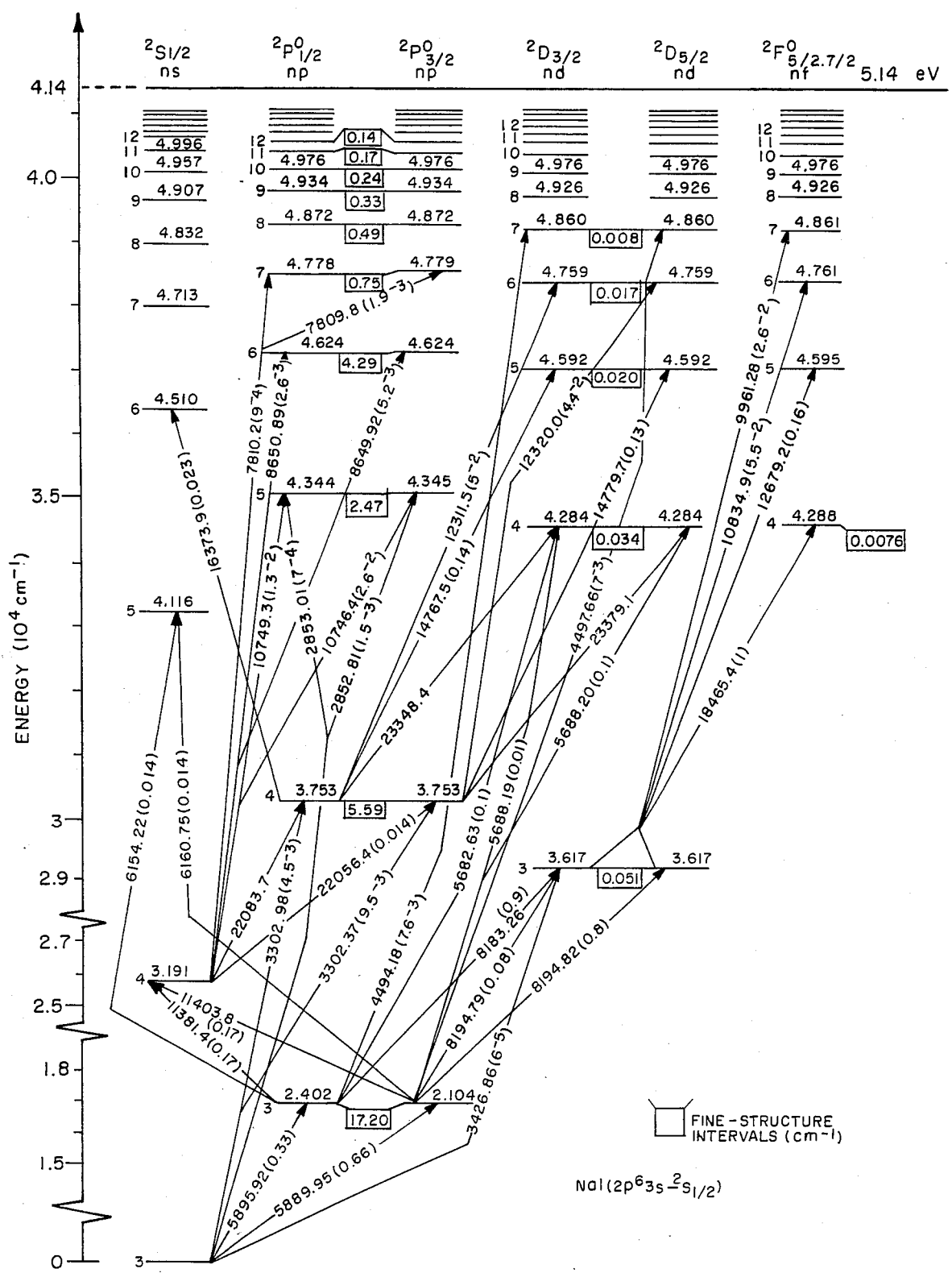
FIG. 4a illustrates the energy level structure of Sodium.
Figure 4B:
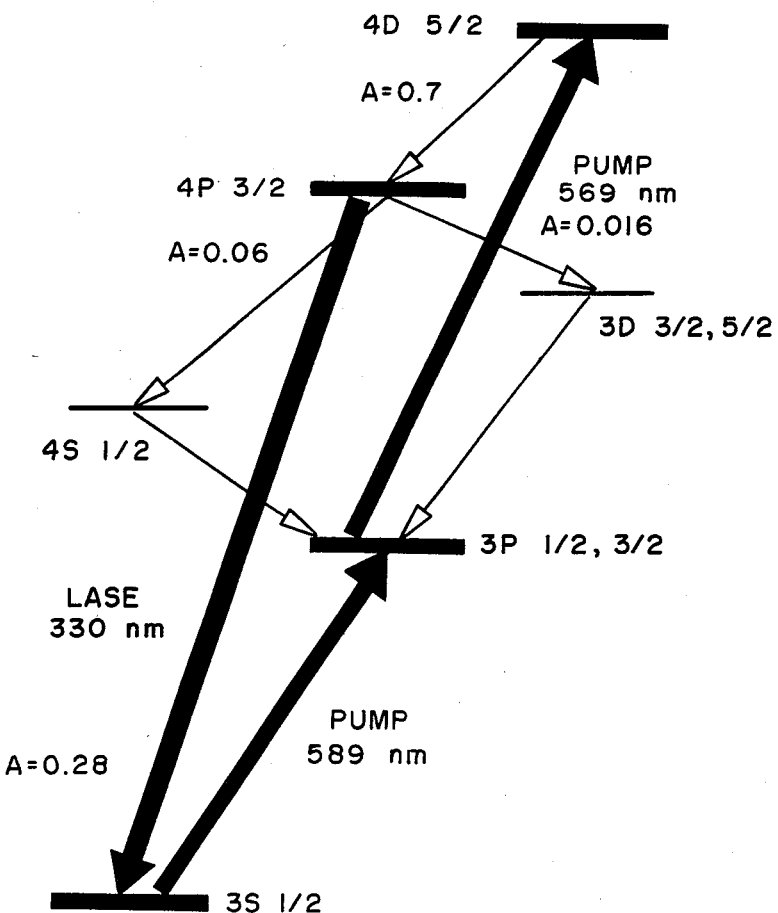
FIG. 4b illustrates the relevant energy levels, Einstein A coefficients, pump and lasing wavelengths for Sodium.
Figure 5A:
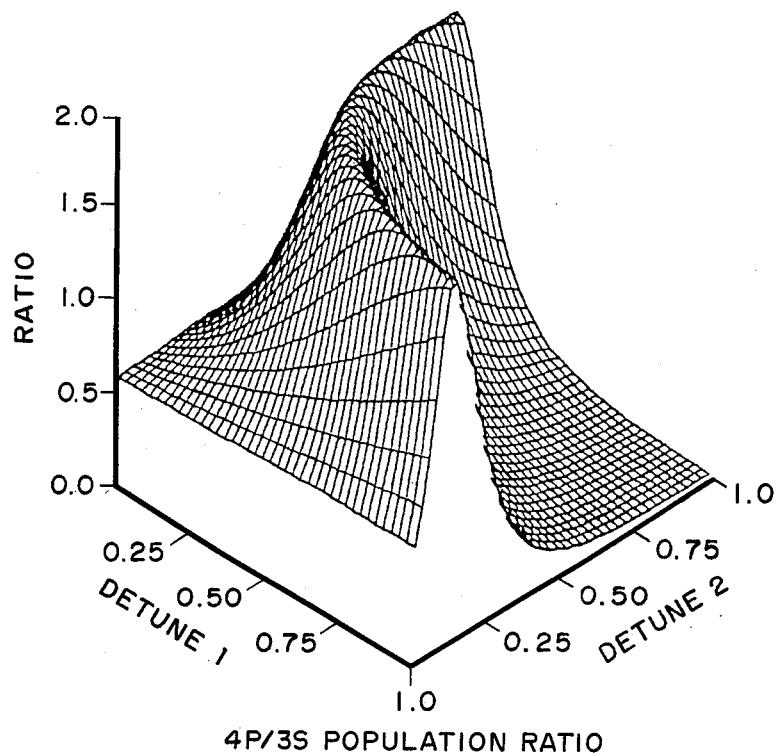
FIG. 5a illustrates the steady state 4P to 3S population inversion ratio as a function of the one and two photon detunings under the conditions described in FIGS. 4a and 4b. Detune 1 is the 3S to 3P (one photon) detuning which runs from 0.2 to 20 GHz. Detune 2 is the 3S to 4D (two photon) detuning which runs from 0.01 to 1 GHz.
Figure 5B:
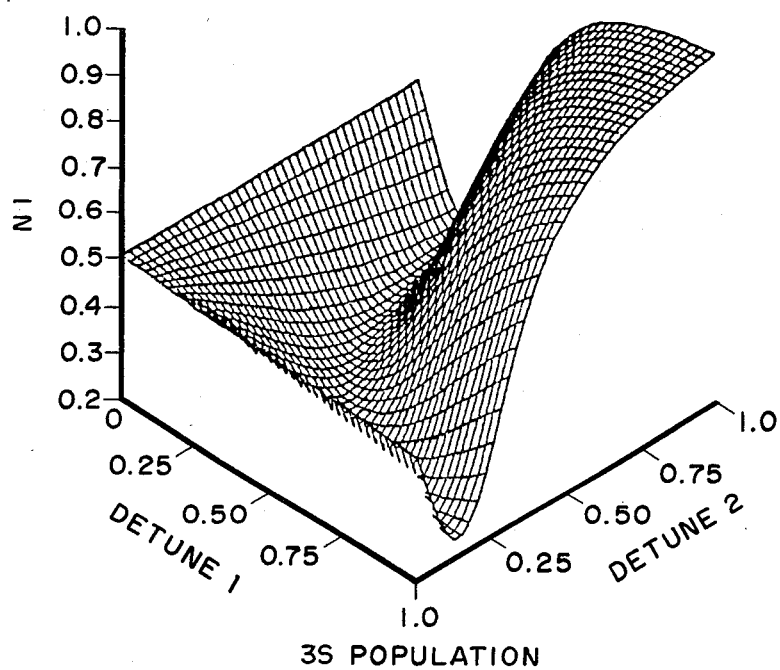
Figure 5C:
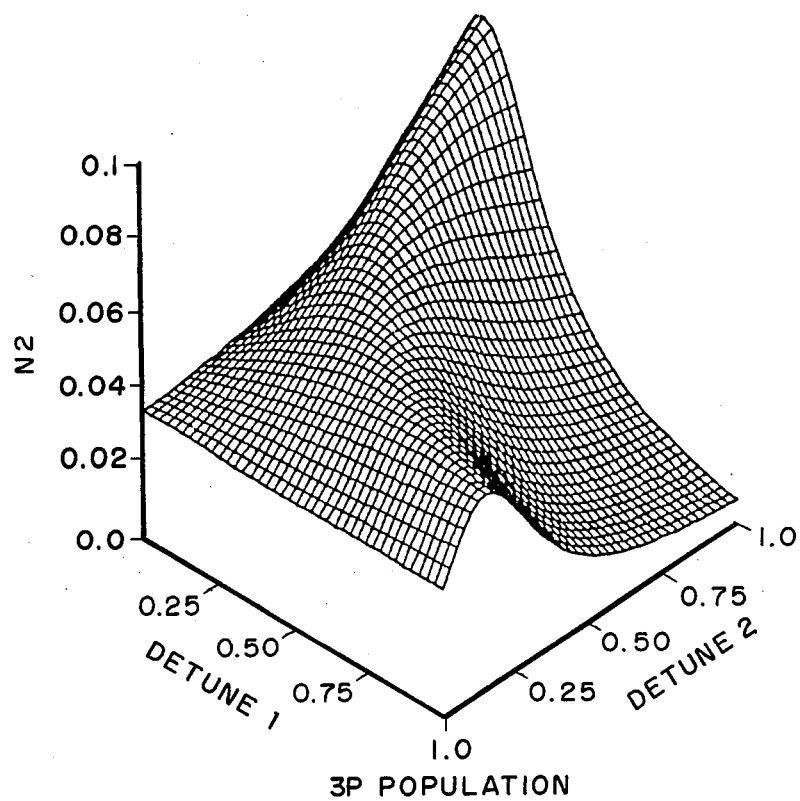
Figure 5D:
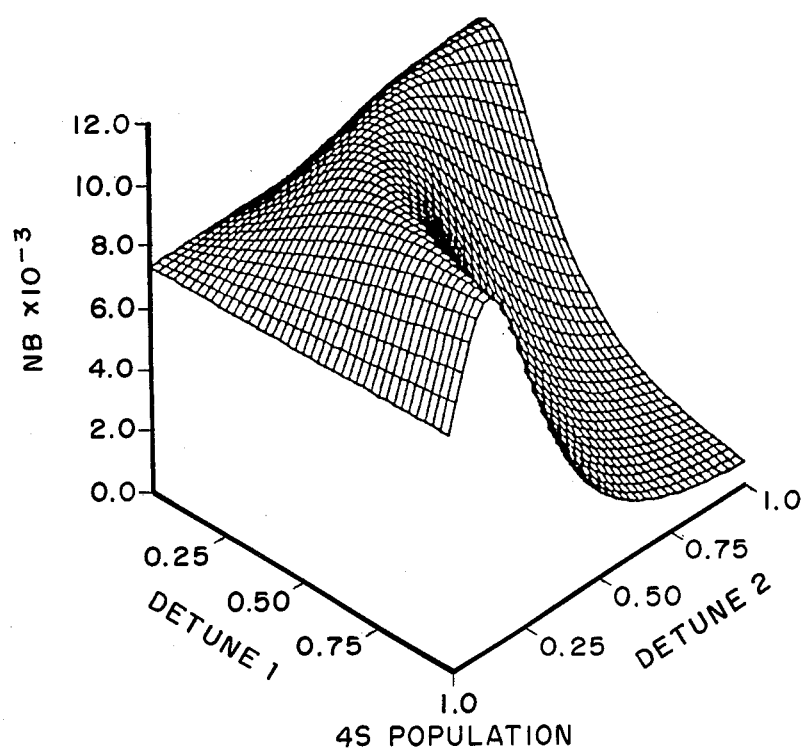
Figure 5E:
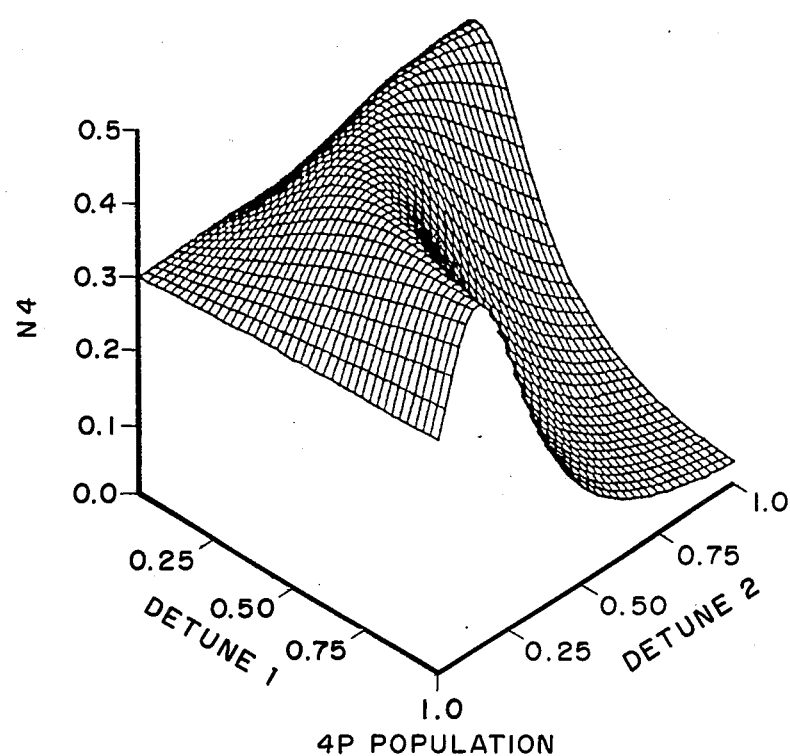
Figure 5F:
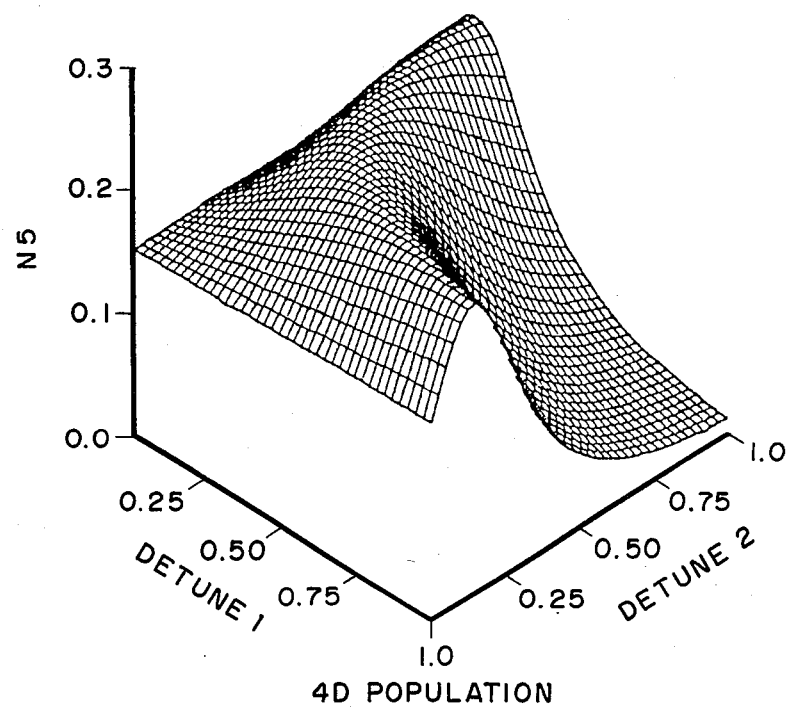

To demonstrate that such an inversion process is feasible in actual materials, the applicant has modeled a number of specific systems. One such system is a low density (<=a few torr) sodium vapor. The sodium energy level structure is displayed in FIG. 4a. The relevant energy levels, pump wavelengths, Einstein A-coefficients (spontaneous emission damping rates), and lasing wavelength are shown in FIG. 4b. Solutions of the full Density Matrix equations for this material are displayed in FIGS. 5a–5f, where the 4P/3S population inversion ratio and the individual level populations are displayed as functions of the 3S−3P (one photon) detuning and the 3S−4D (two photon) detuning. Here, the critical nature of the detuning and pump intensity relations is displayed. The population inversion corresponds to a 330 nanometer optical transition, whereas the pump fields are at 589 nanometers and 569 nanometers. Thus, when the inversion energy is extracted via a stimulated emission process, frequency up conversion results which is not due to a standard nonlinear parametric mixing process.

The applicant's detailed theoretical development on these systems also includes:

(1) cavity feedback equations for frequency adding lasers, which demonstrate strong extraction efficiency, and (2) pump bandwidth studies which indicate that stationary inter-pump phase relations do not effect pumping efficiency, but that dynamic variation of pump phase relations does degrade pump efficiency. For practical systems, such as the Sodium vapor system described above, acceptable pump bandwidths are on the order of or less than 10 GHz to 100 GHz for reasonable pump intensities of 10 W/cm² to 100 kW/cm². Acceptable pump bandwith scales as the square root of the pump intensity.

A brief discussion of the formal theory of near resonantly enhanced multiphoton induced population inversions follows:

The pumping process is governed by a set of density matrix equations $$\frac{d\rho}{dt} = \frac{\hat{i}}{\hbar}[\rho, H] + D\rho \qquad (\hat{i} \equiv \sqrt{-1}) \quad (3)$$

where H is the Hamiltonian for fields interacting with an N level system, D is the damping matrix ($N^2 \times N^2$) (consisting of $T_1$ and $T_2$ type relaxation constants) and $\rho$, the density matrix.

The terms in the Hamiltonian consist of the isolated atom energies $$H_{ii} = E_i \quad (4)$$

and the interaction terms with the various fields. At the outset of analyzing a particular atomic system, possible fields are chosen to achieve resonance with various allowed transisitons where $$\hbar\chi_k \sim E_i - E_j \quad (5)$$

The dipole matrix element $\mu_{ij}$ between the levels result in terms of the form $$H_{ij} = -\frac{\mu_{ij}A_k}{\hbar}\sin(\chi_k t + \phi_k) \quad (6)$$

where the $\mu_{ij}$'s are determined from the Einstein A coefficients. The index k labels the different pump fields and is logically independent of the atomic level indices i and j. We are, in practice, associating each field with one or more resonant level pairs and may therefore define $$
\begin{aligned}
A_{ij} &= A_k \\
\phi_{ij} &= \phi_k \\
\chi_{i \leftarrow j} &= |\chi_k| \\
\chi_{i \leftarrow j} &= -|\chi_k| \\
E_i &< E_j \\
E_i &> E_j
\end{aligned}
\quad (7)
$$

as appropriate, where $A_k$, $\phi_k$, and $\chi_k$ are the amplitude, phase and frequency of the respective fields. The positive and negative transition frequencies defined in Eq. (7) depend on the assigned ordering of the energy levels (i.e., $\chi_{i \leftarrow j} = -\chi_{j \leftarrow i}$) and allow us to further define for any pair of levels directly or indirectly coupled by the pumped transitions a quantity $$
\sigma_{nm}(\{\alpha_i\}) = \sum_{\substack{i=1 \\ \alpha_1 = m \\ \alpha_{l+1} = n}}^{l} \chi_{\alpha_{i+1} \leftarrow \alpha_i} \quad (8)
$$

This quantity is an accumulation of photon energy when the system makes transistions along some pathway from level m to level n. Here the $\alpha_i$'s (i-2,l) define intermediate states along the pathway.

In our analysis, we will use the rotating wave approximation, which will allow us to transform away the sinusoidal time dependence in the fields. For this purpose, the fields are required to be such that the accumulated photon energies in Eq. (8) are *independent* of pathway. Consequently we can write $\sigma_{nm}$ without the $\alpha_i$'s.

Now with this definition and the transformation $$\rho_{ij} = \eta_{ij} e^{\hat{i}\sigma_{ij}t} \quad (9)$$

it can be shown that $$\frac{d\eta_{ij}}{dt} = \hat{i}(\omega_j - \omega_i - \sigma_{ij})\eta_{ij} - \frac{\hat{i}}{\hbar}[\eta, \tilde{\Omega}]_{ij} + (D\eta)_{ij} \quad (10)$$

Here the $\Omega$'s are complex Rabi frequencies given by $$\tilde{\Omega}_{\alpha\beta} = \frac{\mu_{\alpha\beta}A_{\alpha\beta}}{2\hbar} e^{\hat{i}\phi_{\alpha\beta}} \text{ for } E_\alpha < E_\beta$$

$$\tilde{\Omega}_{\alpha\beta} = -\frac{\mu_{\alpha\beta}A_{\alpha\beta}}{2\hbar} e^{-\hat{i}\phi_{\alpha\beta}} \text{ for } E_\alpha > E_\beta$$

The usual Rabi frequencies are just $|\tilde{\Omega}_{\alpha\beta}|$

We note, according to the above definitions, that $$\tilde{\Omega}_{\beta\alpha} = \tilde{\Omega}^*_{\alpha\beta} \quad (11)$$

Finally, we consider the relaxation terms in the damping matrix D, which consist of $T_1$ and $T_2$ type relaxations.

$$D^{(1)}_{ij,kl} = \delta_{ij}\delta_{kl}\left(\frac{1}{T_1}\right)_{i \leftarrow k} \text{ for } k \neq i \quad (12)$$

$$D^{(1)}_{ii,ii} = -\sum_{k=i}\left(\frac{1}{T_1}\right)_{k \leftarrow i}$$

$$D^{(2)}_{ij,kl} = -\delta_{ik}\delta_{jl}\left(\frac{1}{T_2}\right)_{ij}$$

For spontaneous emission damping $$\left(\frac{1}{T_2}\right)_{ij} = -\tfrac{1}{2}(D^{(1)}_{ii,ii} = D^{(2)}_{jj,jj}) \quad (13)$$

and $$\left(\frac{1}{T_1}\right)_{i \leftarrow k} = 0 \quad E_i > E_k$$

$$\left(\frac{1}{T_1}\right)_{k \leftarrow i} \propto \mu^2_{ki}$$

Collecting pieces from the damping and the remaining term leads to the final form $$\frac{d\eta_{ij}}{dt} = -Q_{ij}\eta_{ij} - i\sum_k \tilde{\Omega}_{kj}\eta_{ik} + i\sum_k \tilde{\Omega}_{ik}\eta_{kj} + \quad (14)$$

$$\delta_{ij}\sum_{k \neq i}\left[\left(\frac{1}{T_1}\right)_{i \leftarrow k}\eta_{kk} - \left(\frac{1}{T_1}\right)_{k \leftarrow i}\eta_{ii}\right]$$

where Q is the complex matrix $$Q_{ij} = \left(\frac{1}{T_2}\right)_{ij} + i(\sigma_{ij} + \omega_i - \omega_j) \quad (15)$$

The pump fields for the process are chosen in such a way for the systems of interest that a population inversion is created between certain pairs of levels. In standard laser theory rate equations are ordinarily used to describe the pumping process, but because of the nature of the process that creates the inversion here, rate equations *cannot* be used to describe the basically *coherent* action of the pumps when the damping is slow on the time scale of Rabi cycling.

DETAILED EMBODIMENTS OF THE INVENTION

Figure 6A:
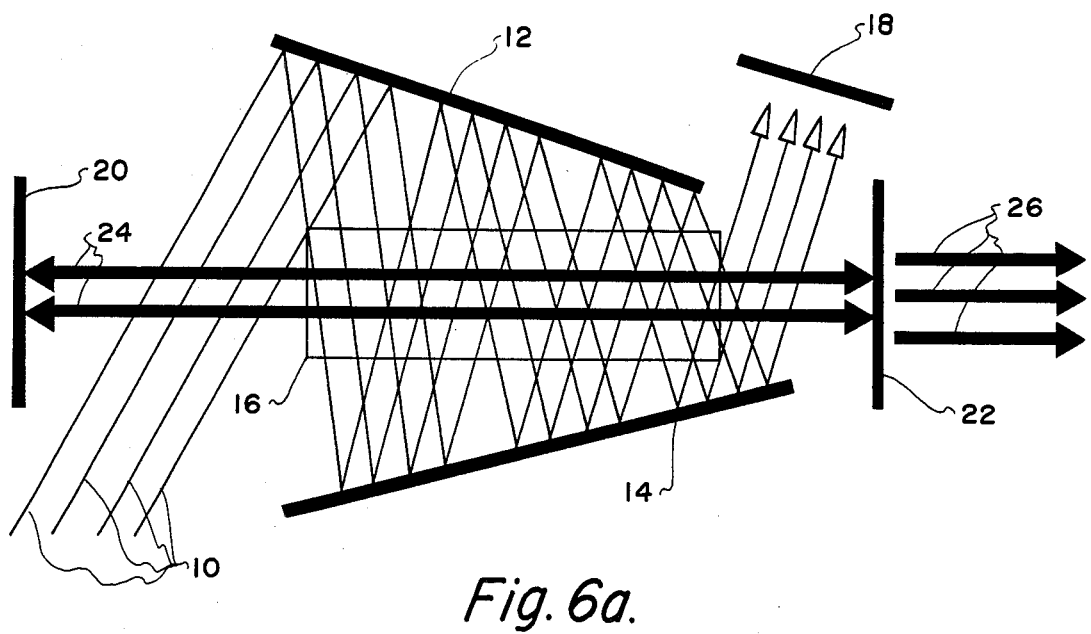
FIG. 6a is a schematic illustration of a frequency up-converting laser.

FIG. 6a is a schematic illustration of a first embodiment of the present invention. This first embodiment is a frequency adding laser or maser. One or more pump beams 10 are injected into a resonator comprised of two or more reflectors 12,14 which are highly reflecting at the pump wavelengths, but do not reflect significantly at the sum (or near sum) frequency. These reflectors 12,14 continually reflect the pump beams so as to maintain their intensity as they are absorbed during their repeated reflection across the laser gain medium 16. These reflectors 12,14 may be replaced by an optical waveguide or lightpipe. In each case the pump intensity is maintained at a level such that the pump induced Rabi frequency in the gain medium remains larger (by at least 1 order of magnitude) than the inverse lifetimes of the medium level transistions. This condition, along with the additional conditions discussed above, insures that a population inversion between a nonadjacent level pair will be created.

A pump retroreflector 18 may be used to help maintain the needed intensity after many pump transits across the gain medium 16, and to increase the efficiency of the energy transfer process. A second resonator, defined by reflectors 20,22, is used to extract the energy stored in the nonadjacent level pair inversion created in the gain medium 16 by the pump beams 10. This second resonator 20,22 is comprised of mirrors which are highly reflecting only at the sum (or near sum) frequency cavity field 24, and hence this optical or microwave cavity supports only the sum frequency mode. Energy is extracted from the second cavity in the sum frequency output beam 26 via standard techniques, e.g. a partially reflecting mirror or an unstable resonator configuration.

Figure 6B:
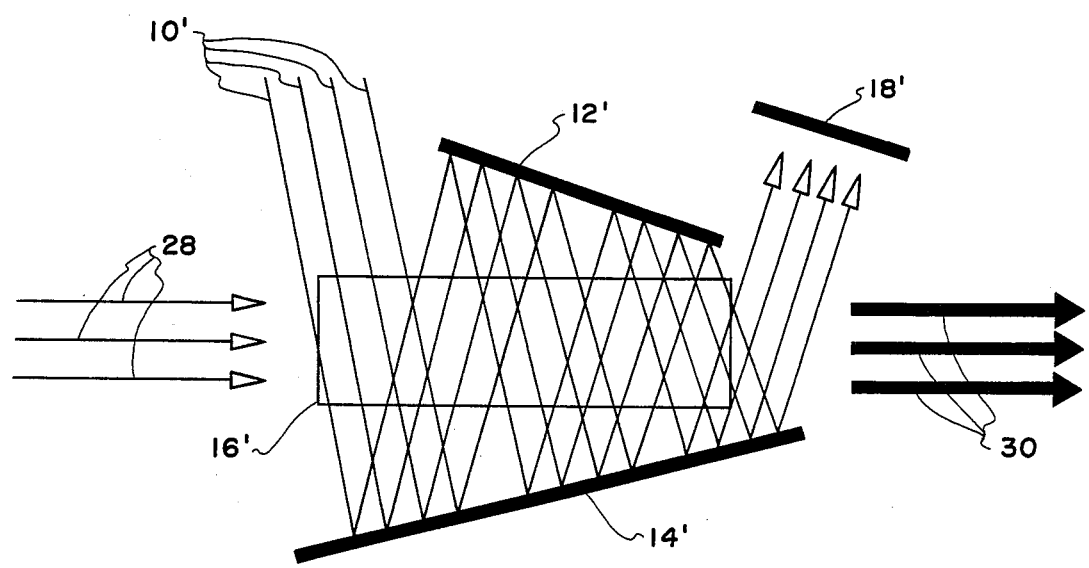
FIG. 6b is a schematic illustration of a frequency up-converting optical amplifier.

The second resonator may be eliminated, as shown in the optical amplifier configuration of FIG. 6b. In this embodiment a low power sum frequency seed beam 28 is injected into the inverted medium 16' and is amplified by stimulated emission into a high power, sum frequency output beam 30.

As discussed in the foregoing section on theoretical considerations, neither spatial coherence nor phase matching of the pump beams is necessary to create the medium inversion. Therefore, poor beam quality pump beams can be converted to high quality output beams by utilizing high quality sum frequency resonators (designated 20,22 in FIG. 6a), or good beam quality seed beams (designated 28 in FIG. 6b). If an adjacent level pair is inverted by pump beams sharing the same transition as the output beam, the optical oscillator (illustrated in FIG. 6a) and optical amplifier (illustrated in FIG. 6b) act as beam cleanup devices. When a nonadjacent level pair is inverted the devices shown in FIG. 6a and 6b act as sum frequency generators. These sum frequency generators do not require the usual phase matching or stringent pump coherence of standard nonlinear optical techniques.

Figure 7A:
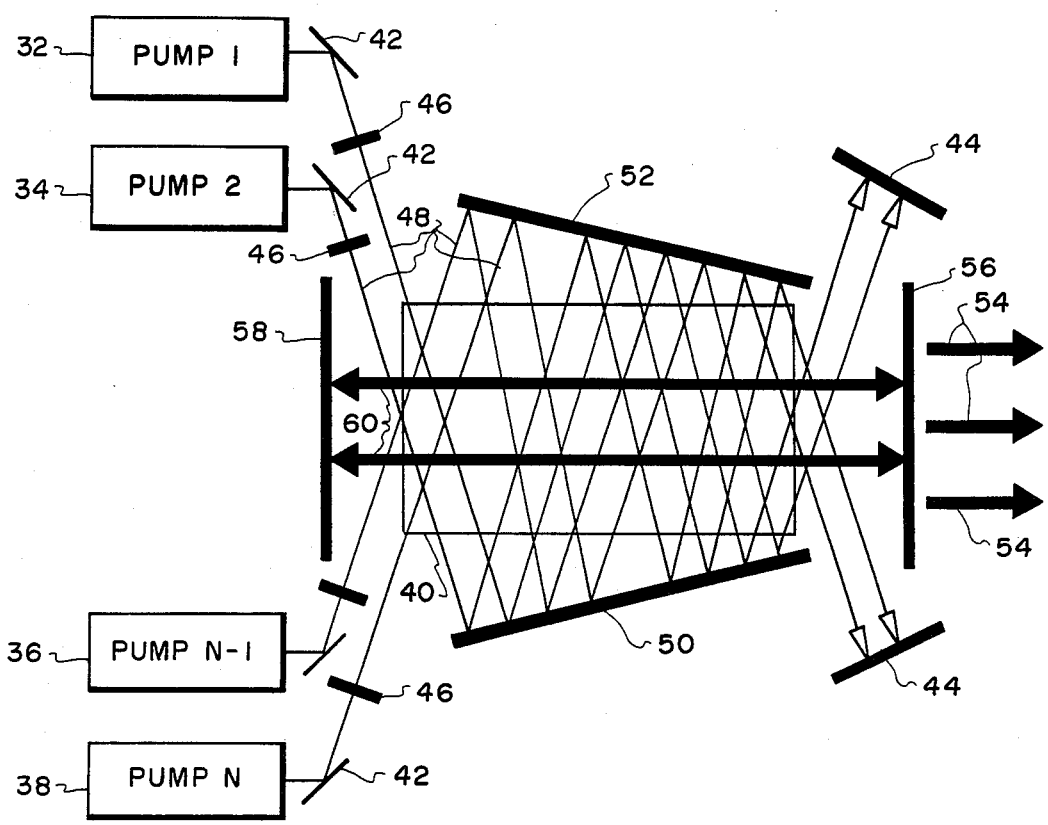
FIG. 7a is a schematic illustration of a phase insensitive optical beam combiner using an optical circuit (etalon).
Figure 7B:
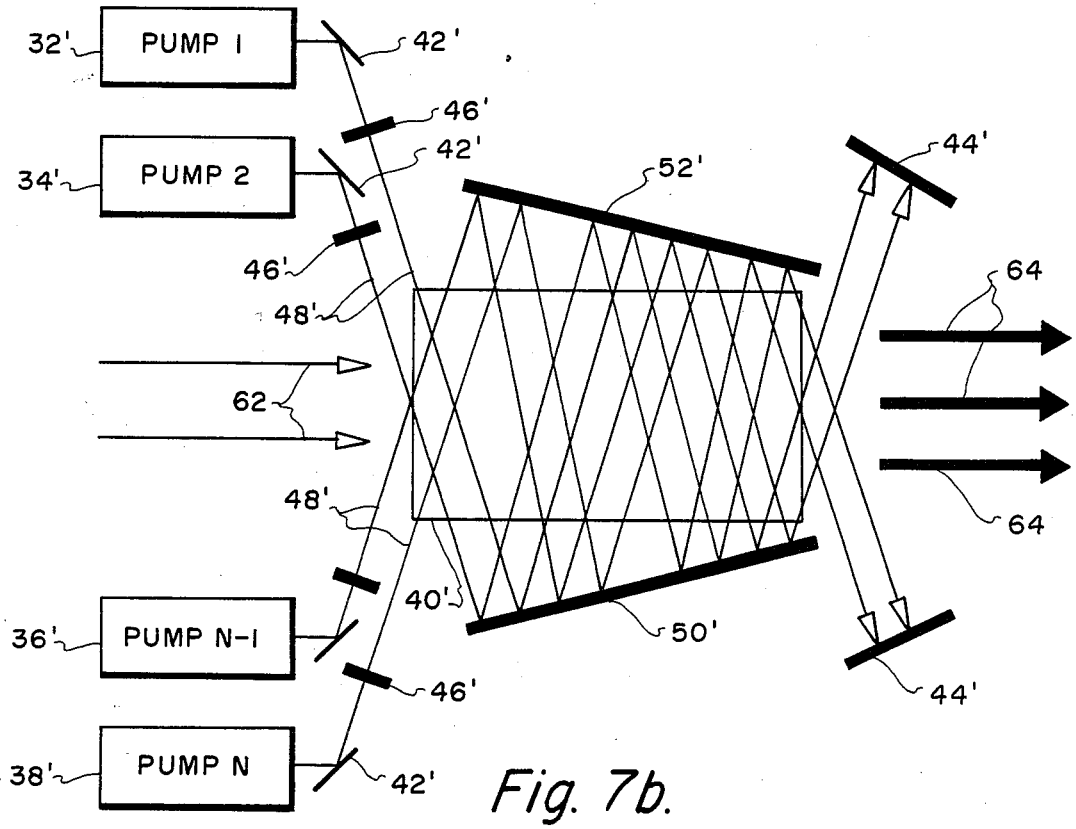
FIG. 7b is a schematic illustration of a phase insensitive optical beam combiner using an amplifier configuration.

FIGS. 7a and 7b display schematics of beam combination devices based on the novel inversion technqiue described above. Referring to FIG. 7a multiple pump lasers 32,34,36,38 are injected into the gaim medium 40 by transfer optics 42. If pump retroreflectors 44 are utilized, optical isolators 46 may be used to prevent disruption of the pump lasers by back reflections. Level pair inversions are created in the gain medium 40 as in FIGS. 6a and 6b by reflecting the pump beams 48 across the gain medium 40 through the use of pump reflectors 50,52. The pump beams 48 need not be phased, or even mutually coherent with respect to one another. The pump beam energy is transferred to the gain medium 40, stored in the medium inversion, and extracted in a single coherent beam 54 by a second resonator comprised of mirrors 56,58 which strongly reflect the cavity field 60.

The mirrors 56,58 may be eliminated, as shown in the optical amplifier configuration of FIG. 7b. In this embodiment a low power seed beam 62 is injected into the inverted medium 40' and is amplified by stimulated emission into a high power, sum frequency output beam 64.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A method for creating population inversions for use in stimulated emission devices which beam combine, beam cleanup, or frequency up-convert electromagnetic radiation, comprising:
   (a) providing a multilevel quantum medium;
   (b) providing pump beams for near resonantly enhanced multiphoton pumping of said multilevel quantum medium, said multilevel quantum medium having atoms or molecules with three or more energy levels whose transition energies are near resonant with said pump beams, said near resonantly enhanced multiphoton pumping being defined such that each pump beam photon energy is close to but not equal to a transition energy between two energy levels of said multilevel quantum medium, thus producing small single photon detunings between the pump beams and said energy levels, these small single photon detunings thereby defining interacting energy levels of said multilevel quantum medium;
   (c) directing said pump beams into said multilevel quantum medium having decay rates into an intermediate energy level greater than decay rates out of said intermediate energy level, said intermediate energy level lying between the lowest and highest of said interacting energy levels, said pump beams having intensities and frequencies satisfying the following limitations;
      (1) the Rabi frequencies are at least one order of magnitude larger than the decay rates between the energy levels of said quantum medium, said Rabi frequencies being defined for each interacting level pair to be $\Omega = \mu E/2\hbar$ where $\mu$ is the magnitude of the dipole moment of said interacting energy level pair, E is the magnitude of the electric field of said pump beam, and $\hbar$ is Planck's constant divided by $2\pi$,
      (2) a maximum cycling of population between the lowest and highest interacting energy level of said quantum medium is produced the condition for said maximum cycling being determined from an analysis of the density matrix equations which describe the interaction of said pump beams with said multilevel quantum system, and
      (3) a multiphoton detuning is produced having a value which is at least one order of magnitude smaller than any of said single photon detunings, said multiphoton detuning being equal to the difference between the sum of said pump beam photon energies and the total transition energy between the lowest and highest of said interacting energy levels divided by Planck's constant;

whereby, each of said pump beams interacts with one pair of energy levels of said quantum medium, said pairs of energy levels of said multilevel quantum medium being connected stepwise such that the upper energy level of one energy level pair is also the lower energy level of the next energy level pair, thus producing a pump driven cycling of population between the lowest and highest of said interacting energy levels of said multilevel quantum medium, said decay rates producing a greater rate of population transfer into said intermediate level than out of said intermediate level resulting in a build-up of population in said intermediate level and thereby creating a steady-state population inversion in said multilevel quantum medium.

2. The method of claim 1 wherein said resonantly enhanced multiphoton pumping of said multilevel quantum medium induces a population inversion in said multilevel quantum medium between a pair of energy levels in which the energy difference between said level pair exceeds the individual pump photon energies, and wherein said multilevel quantum medium is placed within an optical circuit which provides feedback at said level pair energy difference, thereby producing a laser or maser through stimulated emission of radiation in which the coherent output beam is of shorter wavelength than the pump beams.

3. The method of claim 1 wherein said resonantly enhanced multiphoton pumping of said multilevel quantum medium induces a population inversion in said multilevel quantum medium between a pair of energy levels in which the energy difference between said level pair exceeds the individual pump photon energies, and wherein a small seed beam of photon energy equal to said level pair energy difference is introduced into said medium, said small seed beam being amplified during its passage through said inverted medium by stimulated emission of radiation, thereby producing an optical amplifier in which the coherent output beam is of shorter wavelength than the pump beams.

4. The method of claim 1 wherein said resonantly enhanced multiphoton pumping of said multilevel quantum medium by multiple pump beams induces a population inversion in said multilevel quantum medium between a pair of energy levels, the inversion energy thus being supplied by said multiple pump beams, and wherein said inverted quantum medium is placed within an optical circuit which provides feedback at said level pair energy difference which thereby extracts the inversion energy in a single coherent output beam through stimulated emission of radiation, thereby producing a beam combining laser or maser in which said single coherent output beam contains the energy supplied to said multilevel quantum medium by said multiple pump beams.

5. The method of claim 1 wherein said resonantly enhanced multiphoton pumping of said multilevel quantum medium by multiple pump beams induces a population inversion in said multilevel quantum medium between a pair of energy levels, the inversion energy being thus supplied by said multiple pump beams, and wherein a small seed beam of photon energy equal to said energy level pair energy difference is introduced into said medium, said small seed beam being amplified during its passage through said multilevel quantum medium by stimulated emission of radiation, thus extracting the inversion energy in a single coherent output beam, thereby producing a beam combining optical amplifier in which said single coherent output beam contains the energy supplied to said inverted quantum medium by said multiple pump beams.

6. The method of claim 1 wherein said resonantly enhanced multiphoton pumping of said multilevel quantum medium by pump beams of poor beam quality induces a population inversion between energy levels of said multilevel quantum medium, and wherein said multilevel quantum medium is placed within a high quality optical circuit which provides feedback at said energy level pair energy difference, said high quality optical circuit being a device whose coherent output beam has uniform intensity and phase across the beam front, thus producing a laser or maser in which said coherent output beam is of quality determined by said high quality optical circuit, thereby producing a beam clean-up device in which pump beams of poor beam quality are transformed into said output beam of good beam quality.

7. The method of claim 1 wherein said resonantly enhanced multiphoton pumping of said multilevel quantum medium by pump beams of poor beam quality induces a population inversion between energy levels of said multilevel quantum medium, and wherein a high quality seed beam of photon energy equal to said energy level pair energy difference is introduced into said medium, said high quality seed beam being defined as a low power with uniform intensity and phase across said beam, said seed beam being amplified during its passage through said inverted medium by stimulated emission of radiation thus producing an optical amplifier in which the coherent output beam is of quality determined by said high quality seed beam, and thereby producing a beam clean-up device in which poor quality pump beams are transformed into said output beam of good beam quality.

* * * * *